US008949872B2

(12) United States Patent  (10) Patent No.: US 8,949,872 B2
Slaney et al.  (45) Date of Patent: Feb. 3, 2015

(54) AUDIO FINGERPRINT FOR CONTENT IDENTIFICATION

(75) Inventors: Malcolm Slaney, Sunnyvale, CA (US); Andres Hernandez Schafhauser, Walnut Creek, CA (US)

(73) Assignee: Yahoo! Inc., Sunnyvale, CA (US)

( * ) Notice: Subject to any disclaimer, the term of this patent is extended or adjusted under 35 U.S.C. 154(b) by 166 days.

(21) Appl. No.: 13/332,331

(22) Filed: Dec. 20, 2011

(65) Prior Publication Data

US 2013/0160038 A1  Jun. 20, 2013

(51) Int. Cl.
*H04H 60/32* (2008.01)

(52) U.S. Cl.
USPC ............................................................ 725/14

(58) Field of Classification Search
CPC ............ H04N 21/4394; H04N 21/233; H04N 21/8106; H04N 21/8352
USPC ...................................................... 725/9–21
See application file for complete search history.

(56) References Cited

U.S. PATENT DOCUMENTS

| 6,834,308 | B1† | 12/2004 | Ikezoye | |
|---|---|---|---|---|
| 7,487,180 | B2* | 2/2009 | Holm et al. | 1/1 |
| 7,917,645 | B2† | 3/2011 | Ikezoye | |
| 8,332,326 | B2† | 12/2012 | Schrempp | |
| 8,560,583 | B2* | 10/2013 | Mallinson | 705/14.4 |
| 2002/0099555 | A1* | 7/2002 | Pitman et al. | 704/500 |
| 2005/0091275 | A1* | 4/2005 | Burges et al. | 707/104.1 |
| 2006/0190450 | A1* | 8/2006 | Holm et al. | 707/6 |
| 2007/0055500 | A1* | 3/2007 | Bilobrov | 704/217 |
| 2007/0174059 | A1 | 7/2007 | Rhoads et al. | |
| 2009/0157391 | A1 | 6/2009 | Bilobrov | |
| 2009/0254933 | A1* | 10/2009 | Gupta et al. | 725/14 |
| 2010/0306193 | A1* | 12/2010 | Pereira et al. | 707/728 |
| 2011/0041154 | A1* | 2/2011 | Olson | 725/54 |
| 2011/0247042 | A1* | 10/2011 | Mallinson | 725/86 |
| 2013/0057761 | A1* | 3/2013 | Bloom et al. | 348/515 |

FOREIGN PATENT DOCUMENTS

WO  WO 2005-041455 A1  5/2005

OTHER PUBLICATIONS

International Search Report—PCT/US2012/067487 dated Jan. 30, 2013—7 pages.

(Continued)

*Primary Examiner* — Benjamin R Bruckart
*Assistant Examiner* — Aklil Tesfaye
(74) *Attorney, Agent, or Firm* — Martine Penilla Group, LLP (57) ABSTRACT

Methods and system for identifying multimedia content streaming through a television includes retrieving an audio signal from a multimedia content selected for rendering at the television. The retrieved audio signal is partitioned into a plurality of segments of small intervals. A particular segment is analyzed to identify acoustic modulation and to generate a distinct vector for the particular segment based on the acoustic modulation, wherein the vector defines a unique fingerprint of the particular segment of the audio signal. A content database on a server is queried using the vector of the particular segment to obtain content information for multimedia content that matches the fingerprint of the particular segment. The content information is used to identify the multimedia content and the source of the multimedia content that matches the audio signal received for rendering.

19 Claims, 9 Drawing Sheets

(56) References Cited

OTHER PUBLICATIONS

Auditory Toolbox Version 2 by Malcolm Slaney, Technical Report # 1998-010, Interval Research Corporation; https://engineering.purdue.edu/~malcolm/interval/1998-010/—3 pages.

Auditory Toolbox: A M Atlab Toolbox for Auditory Modeling Work, Version 2 by Malcolm Slaney, Interval Research Corporation, © 1993-1994 Apple Computer, Inc.; © 1994-1998 Interval Research Corporation—52 pages.

\* cited by examiner
† cited by third party

Figure 1

Matlab Implementation

C Implementation

AUDIO FINGERPRINT FOR CONTENT IDENTIFICATION

BACKGROUND

1. Field of the Invention

The present invention relates to audio fingerprinting, and more particularly, to audio fingerprinting for connected television.

2. Description of the Related Art

Television viewing has changed over the years. The advancement in technology have allowed television manufacturers to integrate the Internet and web features into television sets providing the ability to connect to and access online interactive media, Internet TV, over-the-top content and on-demand streaming media through these television sets. In addition to the television sets, some of the external devices, such as set-top boxes, Blu-ray players, game consoles and other companion devices, also come equipped with these Internet and web features so as to enable conventional television sets without such integrated features to access the Internet and web features through these external devices. With these Internet-equipped television sets, viewers are able to search and find videos, movies, photos and other content available on the web, available locally or provided directly by content providers, such as cable content providers, satellite content providers, other users, etc. The Internet features incorporated in the TVs and external devices also offer integration with social network sites so as to allow the viewers to interact socially while allowing traditional TV viewing.

The Internet equipped television sets engage various applications to allow a user to search and select the content for viewing. However, the identity of the content to be viewed and/or the source of the content may not be available at the television set. It would be advantageous to be able to identify through a fingerprint the content that is selected for viewing so that additional information related to the content and promotional content, including event related content, can be presented to the viewers. In the current information age, any additional information related to the content is shown to increase user engagement and user satisfaction.

It is in this context that the embodiments of the invention arise.

SUMMARY

Embodiments of the present invention describe methods and systems that allow identification of multimedia content selected for viewing on a television. An algorithm executed by a processor of an Internet-enabled television set or an external device retrieves an audio signal from a multimedia content selected for rendering at a television device, performs fingerprinting of a portion of the audio signal by examining modulation characteristics of the audio signal and uses the fingerprint to identify information related to content from a content provider. The content information may be used to identify additional information or promotional media related to the content or for generating an event for rendering alongside the content.

The embodiments provide a way to determine the source of a multimedia content, such as a video content, using audio signal. Since most of the protected content is identifiable given the audio, analyzing images of the multimedia content is not as important as analyzing the spoken words and music that are broadcast. The current embodiments provide a way to focus on a small segment of the audio signal to identify the entire content by extracting the audio portion of the multimedia content selected for rendering, fingerprinting the audio portion and matching the fingerprint to a corresponding audio portion of multimedia content available in a database to determine the multimedia content. The current embodiments provide an efficient algorithm that focuses on the modulation characteristics of a portion of the audio signal to match to multimedia content obtained from a plurality of content providers. The algorithm also provides the ability to verify that the audio signal is for the same content by storing information related to the content in a local cache and performing periodic verification of the audio signal streaming to the television set. The algorithm performs periodic verification by generating new fingerprints for the streaming audio signal and comparing against the content information in the local cache to determine if the signals continue to match to the content in the local cache or if there is a deviation. If there is deviation, then the algorithm initiates a search on a database server to find a match of content stored therein and the matching cycle continues. If there is no deviation, there is no need to query a database server for finding a match, thereby resulting in resource optimization and matching speed while providing an efficient and accurate matching of the content.

It should be appreciated that the present invention can be implemented in numerous ways, such as, methods and systems. Several inventive embodiments of the present invention are described below.

In one embodiment, a method for identifying multimedia content streaming through a television is disclosed. The method includes retrieving an audio signal from multimedia content selected for rendering at the television. The retrieved audio signal is partitioned into a plurality of segments of small intervals. A particular segment is analyzed to identify acoustic modulations and to generate a distinct vector for the particular segment based on the acoustic modulation. The vector defines an unique fingerprint of the particular segment of the audio signal. A content database on a server is queried using the vector of the particular segment to obtain content information for multimedia content that matches the fingerprint of the particular segment. The content information is used to identify the multimedia content and the source of the multimedia content that matches the audio signal received for rendering.

In yet another embodiment, a method for identifying content streaming through a television is disclosed. The method includes retrieving an audio signal from a content selected for rendering at the television. The audio signal is partitioned into a plurality of segments of small intervals. A particular segment of the audio signal is analyzed to identify acoustic modulations to generate a vector for the particular segment based on the acoustic modulation. The vector identifies a plurality of floating point numbers related to data points of the particular segment and defines a unique audio fingerprint for the particular segment of the audio signal. A content database is searched to identify one or more content with audio segments having data points that are closest to the plurality of floating point numbers of the particular segment. The content database is a repository of pre-computed data points for a plurality of audio segments representing different portions of a plurality of audio signals for a plurality of content obtained from a plurality of content providers. A content with an audio segment that has data points closest to the floating point numbers of the particular segment is identified. A content provider database is queried using a content identifier of the content with the audio segment that matches the particular segment. A portion of the content is received from the content provider database in response to the query. The portion of the content includes content recording matching the particular segment and additional recording for a pre-defined amount of time. The portion of the content received from the content provider database is used in subsequent matching of the audio signal streaming through the television.

In yet another embodiment, a method for matching promotional media for content streaming through a television is disclosed. The method includes retrieving an audio signal from a content selected for rendering at the television. The audio signal is partitioned into a plurality of segments of small intervals. A particular segment of the audio signal is analyzed to identify modulation characteristics and to generate a vector of a plurality of floating point numbers related to data points associated with the audio segment. The vector defines a unique fingerprint of the audio segment. A content database is searched to identify a content having an audio segment with data points that are closest to the plurality of floating point numbers of the particular segment of the audio signal. The content database is a repository of pre-computed data points for a plurality of audio segments representing different portions of a plurality of audio signals associated with a plurality of content obtained from a plurality of content providers. A promotional media related to the content is identified from a service database using the fingerprint of the particular segment. A portion of content is received from a content provider database and metadata and assets related to the identified promotional media from an ad campaign database. Multimedia content for the promotional media is assembled using the retrieved metadata and assets for rendering alongside the content related to the audio signal streaming over the television.

Thus, the embodiments of the invention provide an efficient search and matching algorithm for identifying a source of the content streaming through the television set by fingerprinting a portion of the audio signal extracted from the content using acoustic modulation and matching the fingerprint against content stored in a content database. The matching algorithm uses optimal system resources while providing efficient matching. The algorithm continues to verify the validity of the matching through periodic fingerprinting and matching. The algorithm uses the result of the periodic matching to identify and update event or additional information for rendering alongside the content. The additional information relates to the content currently streaming through the television set and is provided alongside the content in a seamless manner, thereby enhancing the users television viewing experience. The satisfactory user experience can be exploited to increase the monetization by targeting appropriate promotional media to the user.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

DETAILED DESCRIPTION

Broadly speaking, the embodiments of the present invention provide methods and systems to identify multimedia content streaming through a television. An algorithm executing on a processor of an Internet-enabled television or an Internet-enabled external device connected to the television selects an audio segment from the content selected for rendering, generates audio fingerprint and uses the audio fingerprint to identify a source of multimedia content and multimedia content information. The algorithm performs the matching using acoustic modulation characteristics of the audio segment and ensures proper matching through periodic verification while using network resources in an optimal and effective manner. The algorithm utilizes a local cache available to the algorithm for storing matching content and performing periodic verification to ensure that the identified content continues to relate to the streaming content at the television. The algorithm also uses the multimedia content information to identify additional information, such as promotional media and/or event related to the content for rendering alongside the content.

Figure 1:
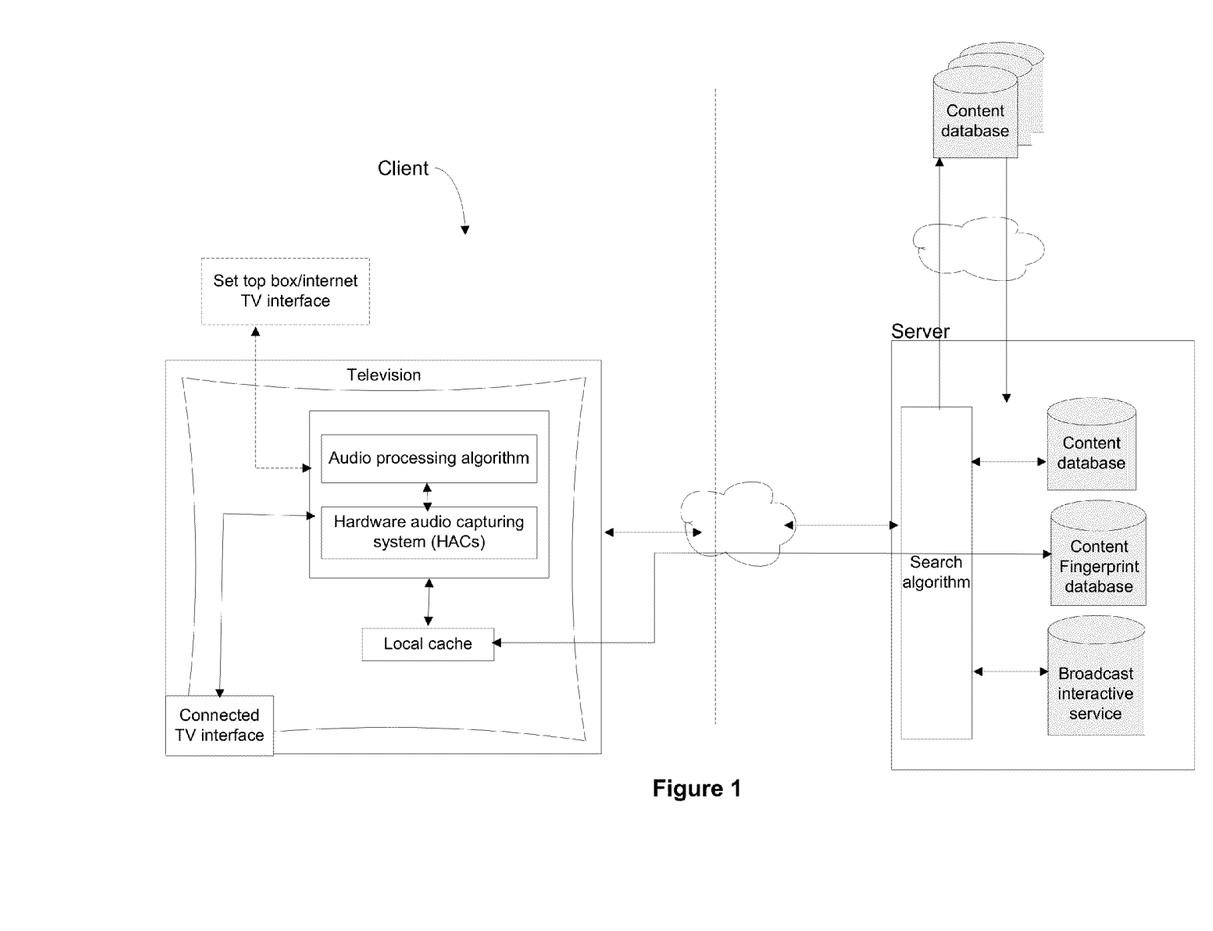
FIG. 1 illustrates a simplified overview of a system equipped with an algorithm including various modules within the algorithm for identifying a source and content of multimedia content streaming through a television, in one embodiment of the invention.

With the brief overview, various embodiments of the invention will now be described in detail with reference to the figures. FIG. 1 illustrates a simplified overview of the system identifying high-level software/hardware modules that are used to identify multimedia content streaming to a television. The system includes a rendering device, such as a television 100, to request and receive content from a content provider. In one embodiment, the television includes an Internet-connection interface 110-a integrated into the television. In another embodiment, the television is connected to an external device, such as a set-top box 110-b with integrated Internet-enabled interface. The Internet-connection/enabled interface, for example, may include Internet protocol suite to receive television services over the Internet, instead of being delivered through traditional modes, such as satellite signal or cable television formats. The television services may include live television, time-shifted television and video-on-demand (VOD) content. Typically, in the Internet-enabled television, the content remains on a content provider's network servers and the requested program is streamed to the television. As a result, the Internet-connection interface in the television is unaware of the source of the requested content and information related to the content. The television is also equipped with a hardware audio-capturing system (HACs) 115 that is configured to interact with the Internet-enabled/connected interface and extract a portion of the audio signal from the content selected from a content provider's network server for streaming to the television, wherein the content selected for streaming is in response to a request by a viewer and could be any one of live television, time-shifted television or VOD content. The HACs interacts with an algorithm 120, such as audio processing algorithm, available at the television to transmit the audio signal captured from the Internet-connection interface for further processing.

The algorithm 120 receives a portion of the audio signal and partitions the portion of the audio signal into a plurality of segments of small intervals. In one embodiment, the portion of audio signal received by the algorithm may be partitioned into segments of 5 second intervals. The algorithm then selects a particular segment for analyzing. In one embodiment, the algorithm may select a particular segment for analysis based on the payload data of the content contained within. The algorithm then analyzes the particular audio segment to determine acoustic modulations of the audio signal and to generate a distinct vector of floating-point numbers. The vector defines the audio fingerprint for the audio signal based on the modulation characteristic of the particular segment. The process of generating a distinct vector defining the audio fingerprint will be described further down with reference to FIG. 1. In one embodiment, using the generated vector, the algorithm queries a content database available on a local server associated with the television to find a match of the fingerprint with data available on the server. The process of matching the fingerprint to content in a content database will be described in detail later with reference to other figures. Upon finding a match, the algorithm obtains content information including source of the multimedia content from a content database. The algorithm may use the content information to retrieve content recording that covers a time of the particular segment and additional recording for a pre-defined amount of time and store it in a local cache 125. The information in the local cache may be used by the algorithm to further verify the content streaming through the television.

In another embodiment, the local cache may be used to pre-populate content and corresponding fingerprints and the algorithm may use the information in the local cache to find a match of the segment of audio signal. In this embodiment, the backend server dynamically collects content related information and the corresponding fingerprint information based on what the user of the television device normally watches, watches more often, what is popular in a specific geographical area of the user (using a zip code of the user), etc. When a user selects content for watching on the television, the algorithm at the television requests the server to download the cache. The server, in response to the request from the algorithm, pushes different subsets of content and the corresponding matching fingerprints onto the local cache of the television. The algorithm then uses the information in the local cache to identify the content selected by the user. The information in the local cache can be used until it expires. When the information expires, the algorithm sends a refresh requests for the content and the fingerprints associated with the content to the backend server and the backend server will forward appropriate content and fingerprint information to load the local cache.

In one embodiment, the algorithm performs fingerprint matching by querying one or more database available on one or more network servers. For instance, the algorithm may first generate a fingerprint of the selected segment of audio signal and query a content database 210 on a network server to find a match of the fingerprint. The content database may be a repository of finger prints for a plurality of portions of a plurality of audio signals obtained from a plurality of content providers. In one embodiment, the content information from a plurality of content providers may be obtained ahead of time and stored in a content database on a server that is locally available to the algorithm so that the content can be easily identified irrespective of time and location where it is broadcast. The audio portion of the content in the content database may be fingerprinted and these fingerprints may be stored either alongside the content or in a separate database on a server that is equipped with a search software and used in the matching of the content that is presently selected for viewing at the television. The search software on the server aids in searching the database and finding a match for content. Using the information, the algorithm executing on a processor of the television then queries a second server, such as an event server or business information service (BIS) server, to determine if there are any BIS service(s), ad campaigns or events for this audio scheduled for the particular time of day that the selected content is streamed. If a service, event or ad campaign scheduled for the time period is found, then the algorithm fetches metadata and assets of the service/event/ad campaign from an ad campaign database to create an application or video for the service/ad campaign. The application or video is rendered alongside the content streaming in the television and provides additional information or promotional media related to the content. A viewer viewing the selected content is provided with additional information that is most relevant to the content being viewed thereby enriching the user's viewing experience. The algorithm provides the ability to extract features of a small portion of the audio signal and use it to match and describe complete video content selected for streaming.

Feature extraction and fingerprinting will now be described in detail with reference to FIG. 1. In a typical audio/video recording, the peaks and transitions of computed features of the media do not change much during editing, compression and transmission. Further, in the speech world, it is determined that most of the speech information is centered around 4 Hz. Consequently, the algorithm captures modulation characteristics of the audio signal using modulation spectrogram and uses audio-modulation fingerprint technology to fingerprint the video. The algorithm generates the spectrogram over time for a particular selected segment of the audio signal and looks for energy distributed around different frequencies. In order to achieve this, the audio signal within the selected segment is split into different bands/channels using bandpass filters. In one embodiment, the selected audio segment is split using 13 linearly-spaced filters to obtain 13 different channels. Additional information related to splitting of the audio signal using bandpass filters is described in "Auditory Toolbox" available at https://engineering.purdue.edu/~malcolm/interval/1998-010/, which is incorporated herein by reference. One or more channels may be combined to provide wider channels for the analysis.

Figure 5:
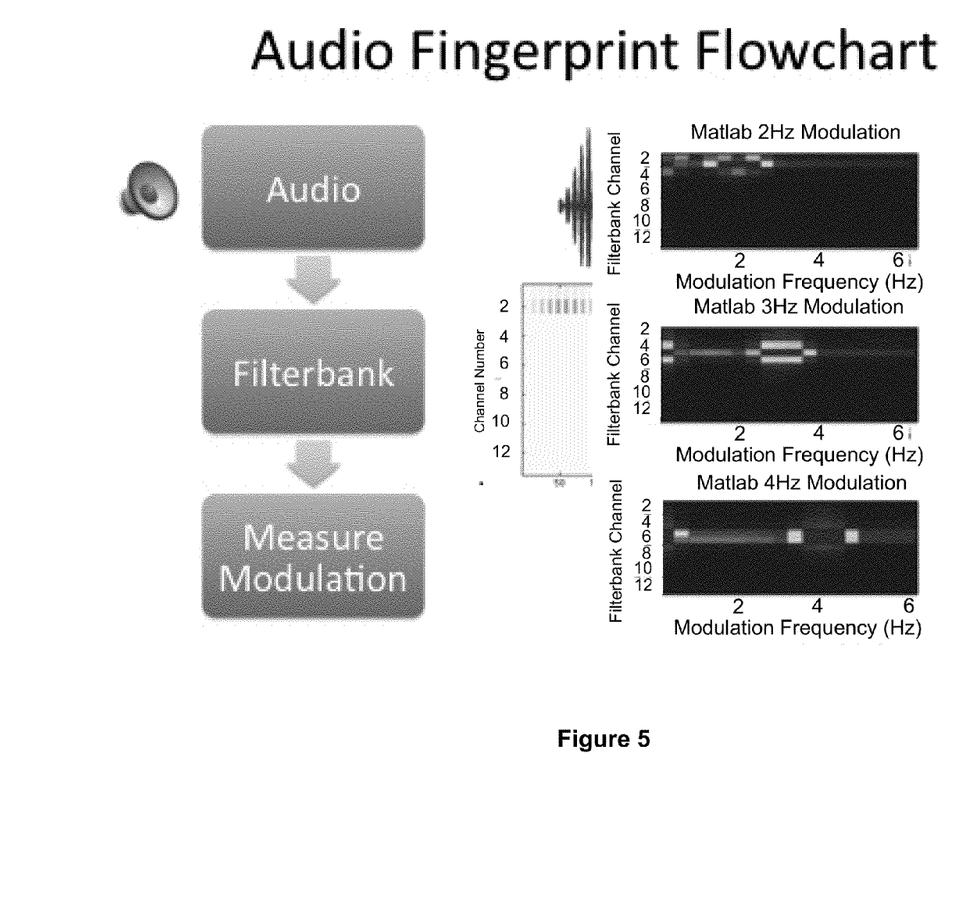
FIG. 5 illustrate, is an exemplary audio fingerprint flowchart followed by an algorithm to generate a fingerprint of an audio segment, in one embodiment of the invention.

After obtaining the audio signal in different channels, the algorithm computes the modulation energy in each channel by taking absolute value of each channel's signal and then uses a low-pass filter with a cut-off frequency at 6 Hz to smooth the response. The modulation energy is a rough measure of temporal information in the channel. The modulation energy provides an important measure of how the audio signal changes over time. In one embodiment, the algorithm uses fast Fourier transform algorithm (FFT) to analyze modulation in each channel. The magnitude obtained from the FFT provides a measure of how much energy is in each channel at each frequency. FIG. 5 illustrates an audio fingerprint flowchart followed by the algorithm to generate the audio fingerprint for the audio segment extracted from the content streaming to the television, in one embodiment of the invention. As illustrated, the fingerprint is generated by extracting an audio signal from the streaming content and passing a particular segment of the audio signal through a filterbank to split the audio segment into a plurality of channels at different frequencies. The magnitude of modulation at each channel in each frequency is measured to determine the energy distribution in each channel at each frequency.

Focusing just on the magnitude and ignoring the phase of the frequency spectrum, enables the algorithm to obtain same fingerprint for the content even when the audio data has shifted slightly in the analysis window. Using the modulation spectrogram, the algorithm computes, for each bandpass channel, 18 measurements of each channel's modulation at frequencies from 0 Hz (DC) to about 6 Hz. The 18 measurements are selectively chosen from a two-dimensional array of channel number versus modulation frequency. Thus, with 13 channels of modulation spectrum and 18 independent frequency measurements at each channel, the algorithm computes a single, distinct vector of 234 elements (i.e. 13*18) for the selected segment of the audio signal. Each of the elements of the vector is a data point represented as a floating point number. This distinct vector succinctly describes the modulation in the audio signal over the short segment and forms the fingerprint for the audio signal.

Figure 4:
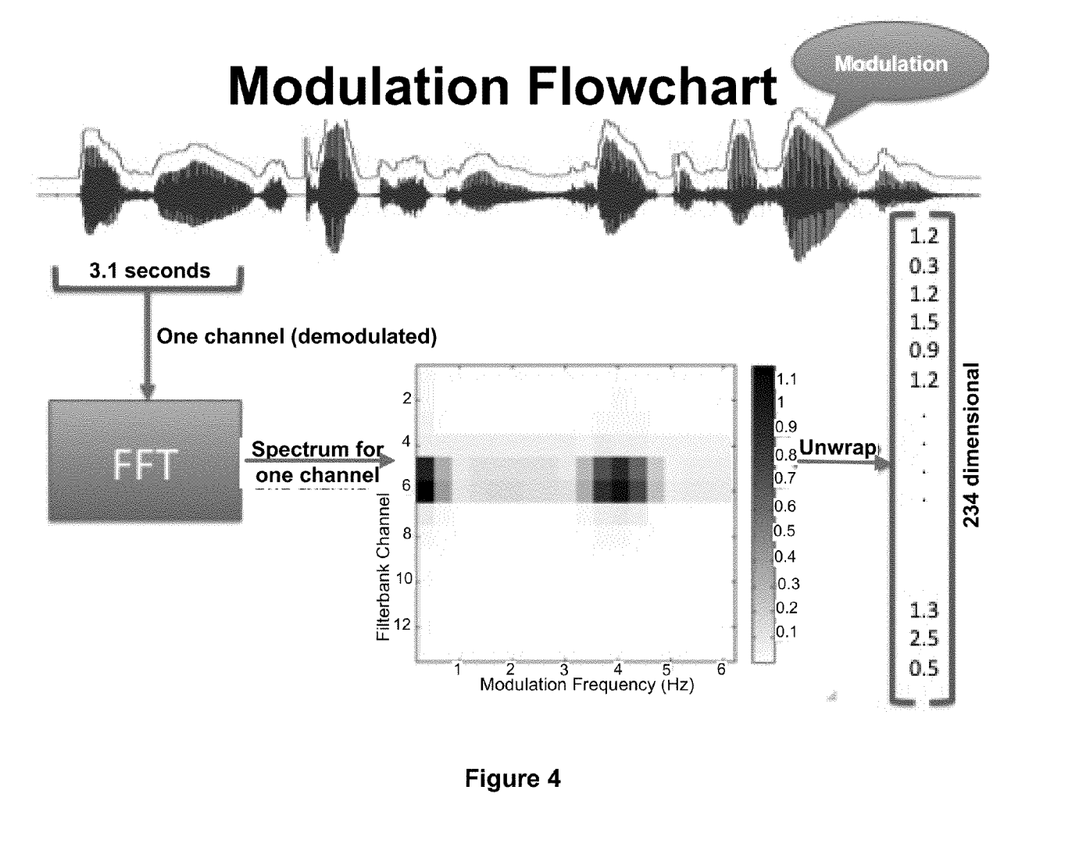
FIG. 4 illustrates an exemplary modulation flowchart that is used to generate a distinct vector by analyzing the modulation characteristics of an audio segment, in one embodiment.

FIG. 4 illustrates a modulation flowchart followed by the algorithm to generate a distinct vector for an audio segment of a audio signal extracted from a content that is selected for streaming at the television. The algorithm examines acoustic modulation of a particular channel and uses FFT to generate an acoustic spectrum for the particular channel. Selective data points from the acoustic spectrum (234 data points) are selected to compute a vector of the audio segment.

Figure 2A:
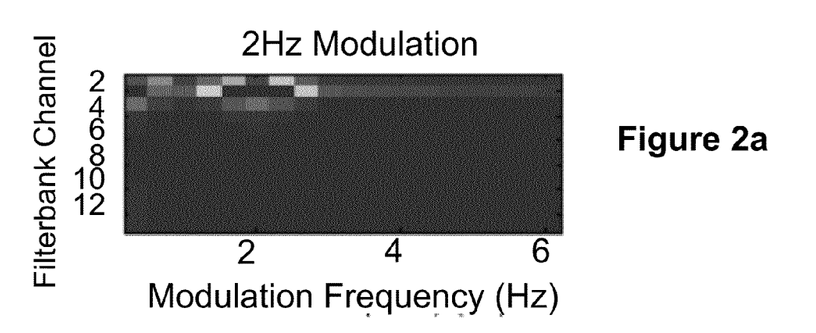
FIGS. 2a-2f illustrate a simplified graph comparing modulation characteristics of a sample audio segment of an audio signal using C and Matlab implementation of an algorithm, in one embodiment of the invention.
Figure 2B:
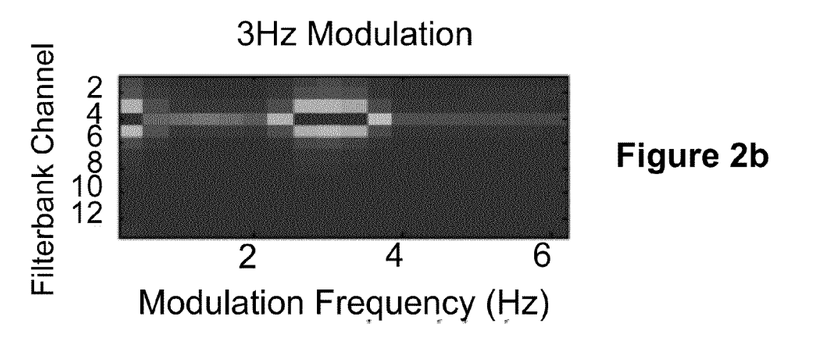
Figure 2C:
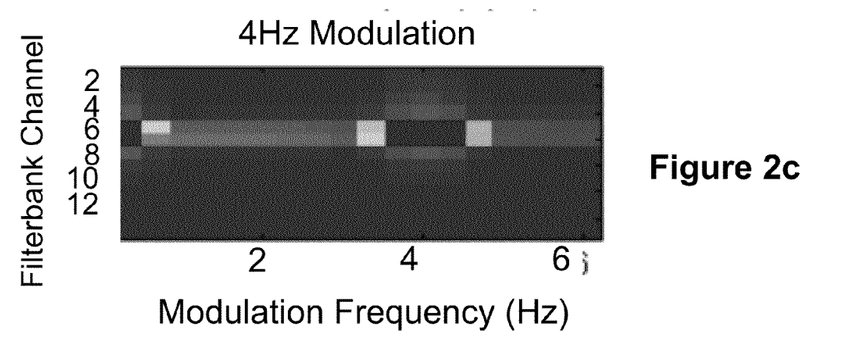
Figure 2D:
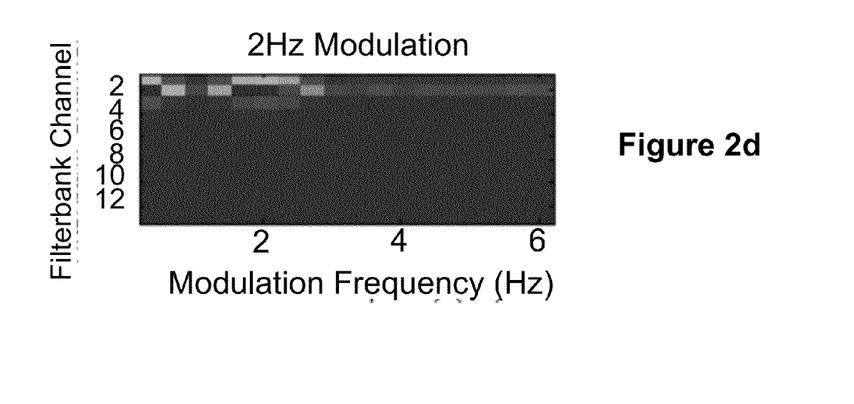
Figure 2E:
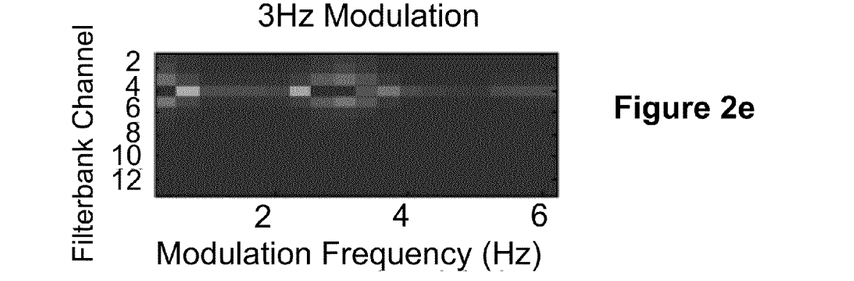
Figure 2F:
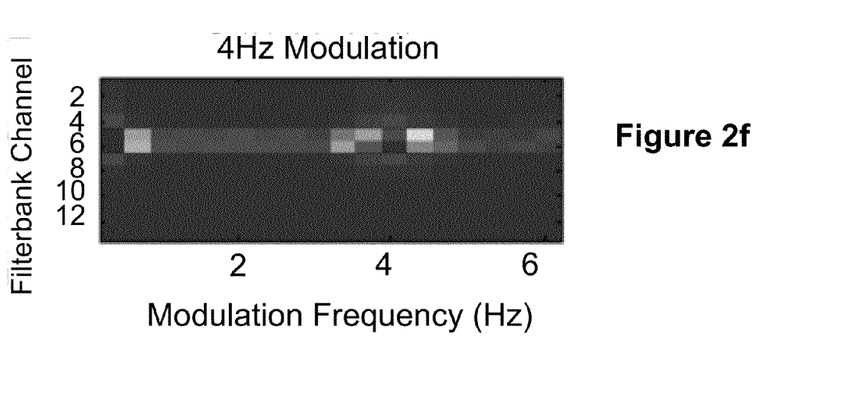

FIGS. 2a-2f illustrate audio signal spectrograms generated and used by the algorithm to match to content from a content provider. FIGS. 2a, 2b and 2c are generated using a Matlab implementation of three-modulated tone test with frequency modulation 441, 881 and 1201 Hz modulated with 2, 3 and 4 Hz. When a low frequency modulator filter (for e.g. 2 Hz) is used, a low channel with a low modulation frequency is recorded, as illustrated by FIG. 2a (Matlab implementation). Similarly, FIG. 2b illustrates the result from a slightly higher frequency modulator filter of 3 Hz and FIG. 2c illustrates the result from a still higher frequency modulator filter of 4 Hz. It should be noted herein that the audio signal spectrogram generated by using Matlab implementation is exemplary and should not be considered restrictive. Other types of implementation, such as C implementation, may be used, as shown in FIGS. 2d, 2e and 2f. It can be noticed from FIGS. 2a-2f that the results from the C implementation are similar to results from the Matlab implementations of modulator frequency at each of the 3 different frequencies. Further, each frequency of sound has its own unique fingerprint and the audio signal with these different frequencies will generate its own unique combination of fingerprint. The bigger the fingerprint the easier it is to match. In order to get a good sampling, a 5 second window is selected for segmentation and fingerprinting, in one embodiment. The time period used for segmenting the audio signal, the number of channels and the number of frequency are exemplary and should not be considered restrictive.

After generating the spectrogram for a particular audio segment and generating a distinct vector, the algorithm uses the vector to find a match of content in a content database. The content database may be located on a server and available to the algorithm through the network, such as the Internet. The content database is a repository of content received from a plurality of content providers with audio signals of the content already fingerprinted. The fingerprint of the audio signals are stored alongside the content or in a separate database with each fingerprint mapped to the content. The algorithm may use various techniques to find a match of the vector. In one embodiment, the algorithm uses a randomized algorithm, such as Locality Sensitive hashing (LSH) methodology, to look up and find a match of the content in the content database. When new content is selected for streaming to the television, the algorithm captures the audio portion of the content and partitions the content into segments of small intervals of 5 seconds, for example. The algorithm then performs the same analysis (explained earlier) to obtain a fingerprint of a particular segment of the captured audio signal and the fingerprint of the captured audio signal is matched against the ones stored in the database using the floating point numbers of the vector. It should be noted that even if the content of the captured audio signal is the same as an audio signal in the content database, the signals might not exactly match. This might be due to the fact that the audio signal in the database may have undergone different compression technique and have a different temporal offset than the audio signal associated with the particular segment that is being matched. Thus, direct and regular matching will not provide the expected matching result. In order to accommodate this change in the compression techniques, the algorithm may use the LSH technique to find nearest neighbor match.

Figure 3:
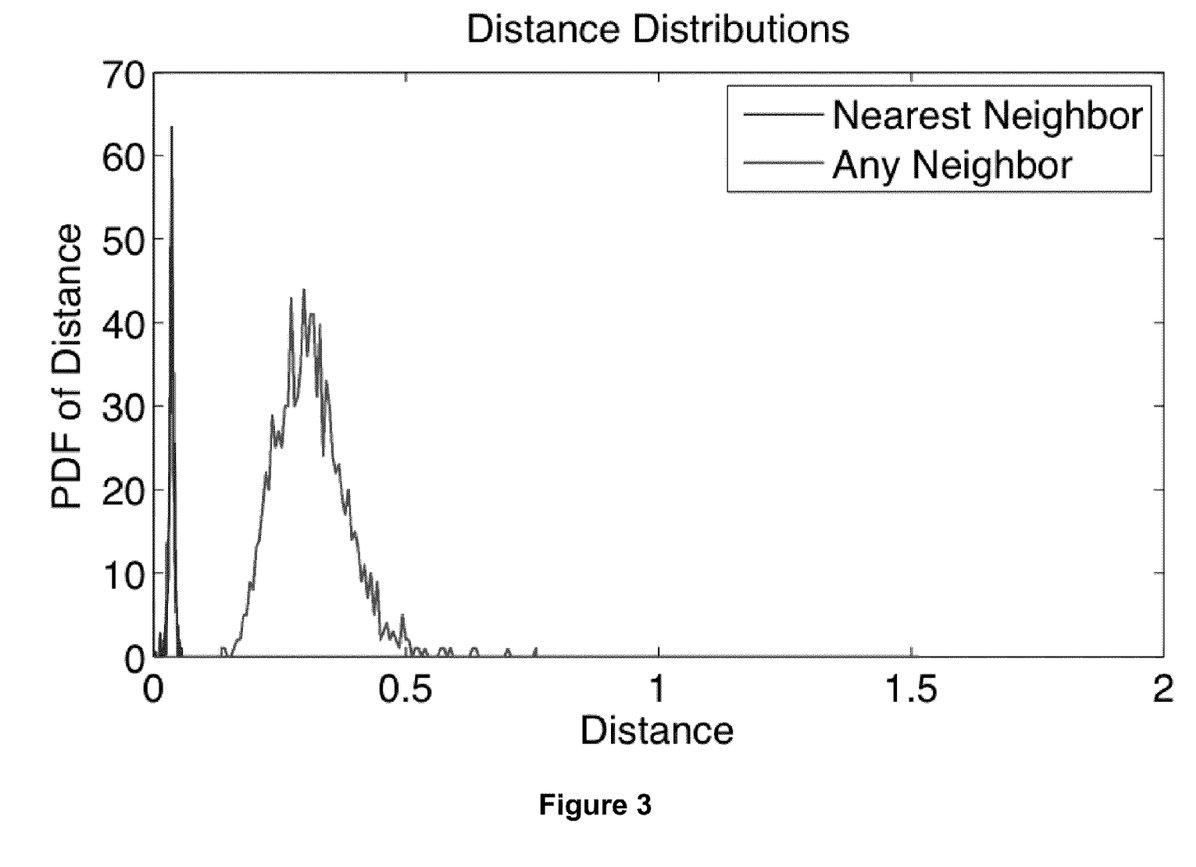
FIG. 3 illustrates a graphical representation of a locality sensitive hashing technology used in matching a particular segment to a corresponding segment of content, in one embodiment of the invention.

FIG. 3 illustrates the comparison of the fingerprint of a particular audio segment with the pre-determined fingerprints from a content database using the LSH matching technique. The LSH matching uses each of the 234 floating point numbers from the segment of audio signal for the new content streaming to the television and tries to match to corresponding data points of an audio signal for a content in the content database. The 234 floating point numbers were obtained using modulation spectrogram as explained earlier. It should be understood that generating a vector of 234 floating point numbers and using LSH matching technique for matching the vector of 234 floating point numbers is exemplary and should not be considered restrictive. As a result, alternate ways of matching the segment of audio signal may be employed. The algorithm computes the distance between each of the data points of an audio segment in the content database to the corresponding floating point numbers of the particular segment of audio signal. When the algorithm finds a plurality of audio signals with data points that are closer to the corresponding data points of the particular audio signal, the algorithm determines the audio signal of content whose data points are closest to the data points defined by the floating point numbers in the vector of the particular audio segment. When more than a content has audio signals that are closest to the data points of the particular audio segment, we take a further sampling by taking a subsequent audio segment of the content selected for streaming, analyze the subsequent audio segment to define a second vector and use the second vector to find a match. The sampling, analyzing and matching may be continued till a good match is found. For more information about Locality Sensitive Hashing technique, reference can be made to the IEEE publication entitled, "Locality-Sensitive Hashing for Finding Nearest Neighbors," by Malcolm Slaney and Michael Casey, IEEE Signal Processing magazine, March 2008, which is incorporated herein by reference.

The matching of the content enables the algorithm to identify source of the content and to retrieve information associated with the content selected for streaming to the television. In one embodiment, the algorithm requests and receives content from a server that includes a match of fingerprint for the content for the period of the particular segment to which it is matched and also additional upcoming fingerprint for a predefined amount of time. The server interacts with a plurality of content providers and receives content from these sources. The additional content is used for subsequent matching of the audio signal. In one embodiment, the content and the additional content are received and stored in a local cache available to the algorithm. The algorithm may ensure that the audio segment is matched to the correct content by verifying that one or more of the subsequent segments of the audio signal continue to match with the audio segment of the content stored in the local cache. If the subsequent audio segments of the audio signal match the audio segments of the content, there is no need to query a server to obtain the content. Instead, the content may be provided from the local cache. If, on the other hand, the subsequent audio segments do not match with the content stored in the local cache, a new content from the content database matching the particular audio segment is retrieved and stored in the local cache for subsequent matching.

There are many options to cache and distribute the work using the audio fingerprint matching of the current embodiments. Some of the most important options include advance hinting, local caching, and verification. Advance hinting is a method where a single fingerprint request is answered with the matching content identifier and a sequence of upcoming fingerprints. The newly received fingerprint along with the content ID is stored in a local cache on the TV for subsequent reference and verification. The upcoming fingerprints allow the TV or set-top-box connected to the TV to identify what is coming in the future and simply check the newly calculated fingerprints of the content against the upcoming fingerprints stored in the local cache. If the newly calculated fingerprints match the expected upcoming fingerprints then there is no change in the content provider source, and no need to query the content provider for the content identifier.

In one embodiment, the local caching option is called, wherein the fingerprint and the content matching the fingerprint of the audio signal is downloaded and stored in the local cache for matching against the upcoming fingerprints of the audio signal. In another embodiment, content and a set of fingerprints related to a plurality of content is downloaded to the local device (i.e. TV) and stored in the local cache. In this embodiment, the set of fingerprints may relate to content that is scheduled for a specific period of time. The client can request and receive the set of fingerprints periodically, such as once a day or once every 3 hours, etc. In one embodiment, the client computes the fingerprint from the audio signal and only performs an action on the content, if the content matches one of the known fingerprints stored in the local cache. By performing action only when there is a match, network resources are preserved as the algorithm avoids making unnecessary server trips to find a match.

In one embodiment, the verification option is called, wherein the algorithm sends a request to the server along with a content identifier based on a best guess of the content. In one embodiment, the best guess of the content may be based on a previous query. The server receiving such a request just verifies and confirms that the fingerprint received from the algorithm in the TV is indeed the expected fingerprint of the content related to the content identifier obtained in the request. This option also saves network resources as the server is already provided with enough content related information to identify the content. The local cache along with fingerprint, thus, provide for a faster and accurate match of the content that is selected for rendering at the TV while preserving network resources.

The content identity information is used by the algorithm to identify an event, promotional media or ad campaign and fetch metadata and assets for the ad campaign or event, in one embodiment of the invention. In this embodiment, metadata and assets are used to assemble a video or application for rendering alongside the content. Once the video or application is rendered alongside the content, the algorithm continues to verify the validity of the matching by continuing to perform matching of subsequent segments of audio signal to ensure that the content has not changed over time. If the content has changed, then the algorithm reinitializes the data in the local cache and starts the extraction of audio signal, generation of the distinct vector and matching of the vector to content in a content database to identify source of the new content and information related to the new content so that the promotional media or event can be identified and assembled for rendering with the new content.

Figure 6:
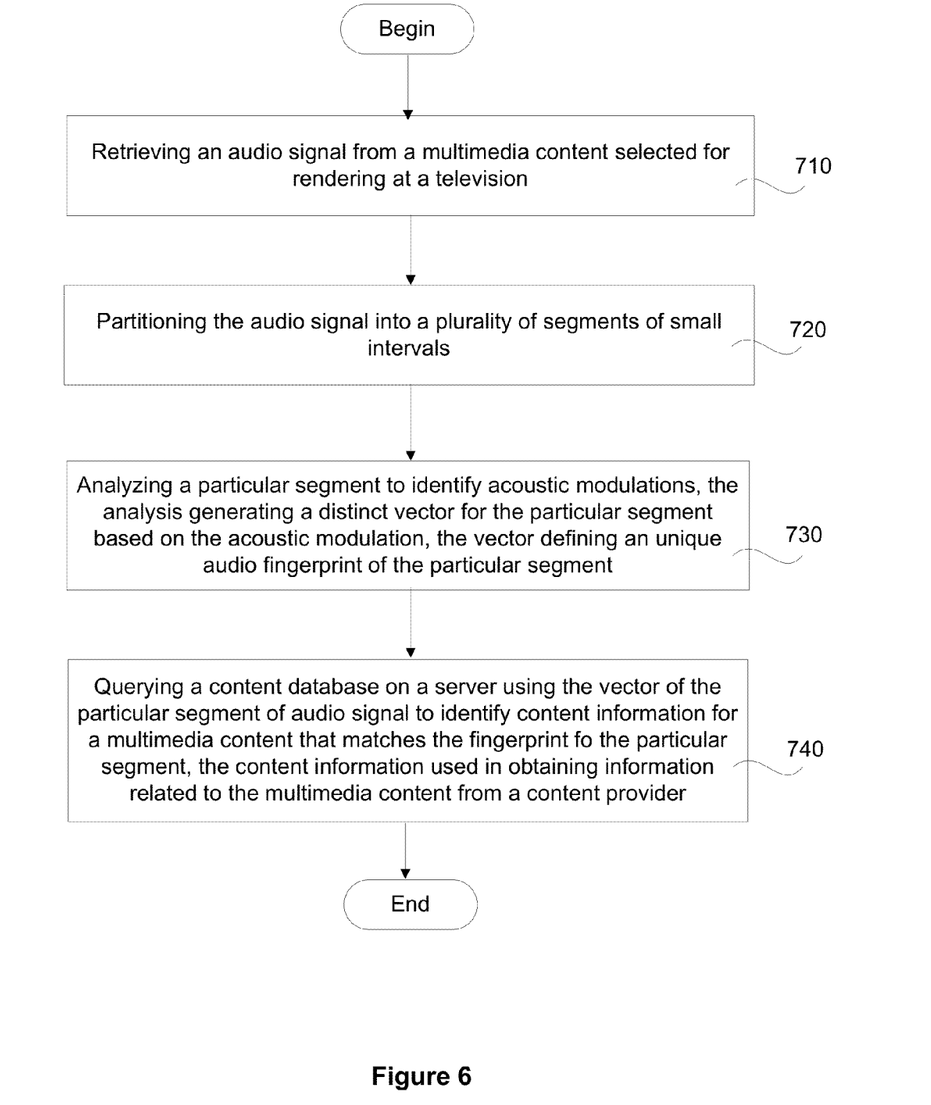
FIG. 6 illustrates a flow chart of process flow operations used by an algorithm for identifying multimedia content streaming through a television, in one embodiment of the invention.

FIG. 6 illustrates a flow chart of operations used for identifying multimedia content streaming through a television, in one embodiment of the invention. The method begins at operation 710 wherein an audio signal is retrieved from a multimedia content selected for rendering at the television. The multimedia content may be obtained from any one of the content sources including satellite provider, cable provider, DVR, Blu-ray player, live media from the Internet. The multimedia content might be stored on a content provider server and streamed to the television upon request from a viewer. As a result, the source of the content and content information is not available at the internet-connection interface of the television or external device connected to the television. In order to identify the source of the content and content information, an algorithm may partition the audio signal into a plurality of segments of small intervals, as illustrated in operation 720.

A particular segment of the audio signal is analyzed to identify acoustic modulations in the particular segment, as illustrated in operation 730. The particular segment is selected for analysis based on the payload data contained within. The analysis of the particular segment results in the identification of a plurality of data points represented by distinct floating point numbers. The plurality of floating point numbers are used to generate a vector. The vector of floating point numbers is used to query a content database on a server, as illustrated in operation 740. The server is equipped with a search algorithm that assists in the location of content from a particular content provider wherein the content of the particular content provider includes segment of data whose data points either match or is in close proximity to the floating point numbers of the particular segment. The content in the content database is obtained from a plurality of sources and the audio signal of these contents are pre-fingerprinted and stored alongside the content or in a separate database and mapped to the contents in the content database. As a result, when an audio segment of the content from a particular content provider matches the particular segment of content streaming to the television, information related to the content and the source of the content is retrieved from the content provider. The retrieved information may be stored in a local cache and used for further verification of the content streaming through the television.

Figure 7:
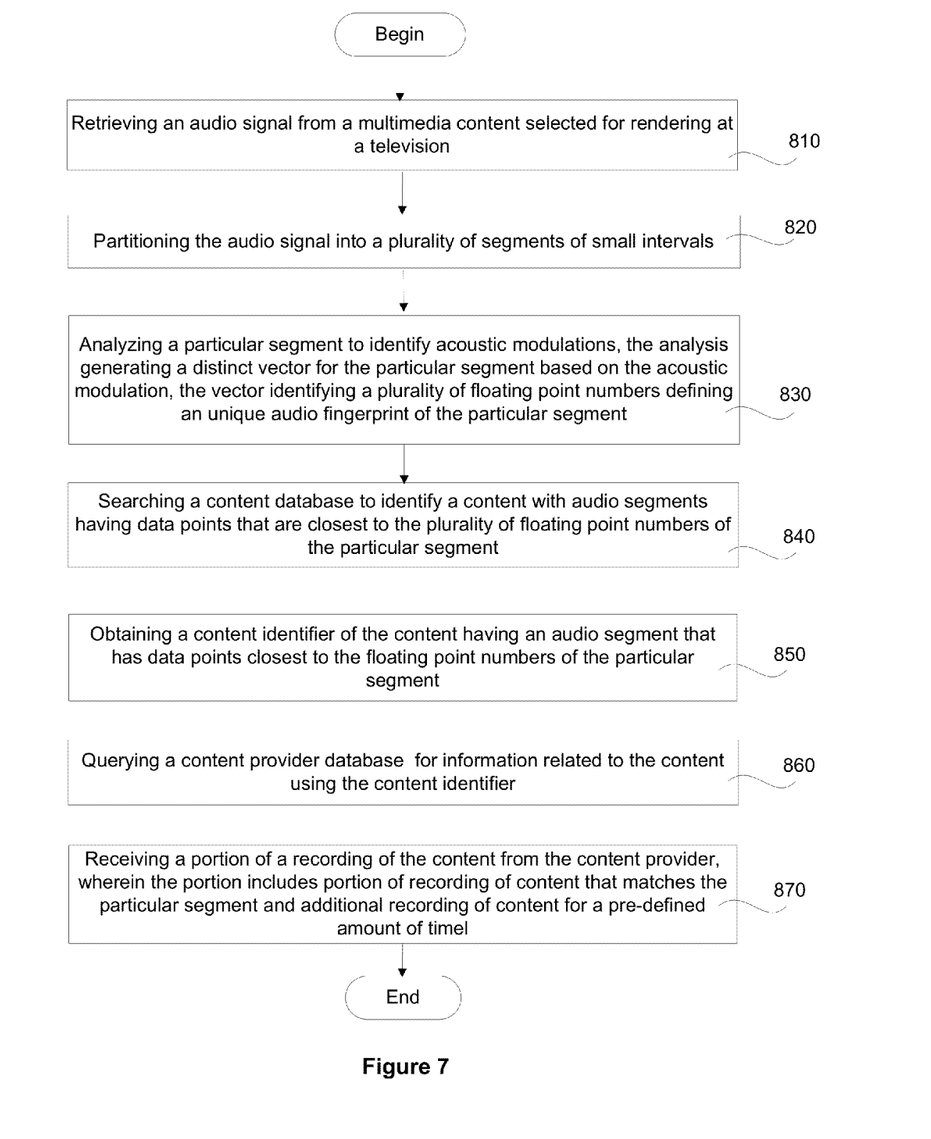
FIG. 7 illustrates a flow chart of various process flow operations used by an algorithm for identifying multimedia content streaming through a television, in an alternate embodiment of the invention.

FIG. 7 illustrates an alternate embodiment of the invention for identifying content streaming through a television. The process begins at operation 810 wherein an algorithm within the television recognizes selection of a particular content for streaming through the television. The content can be from any one of the content providers. An audio signal from the selected content is retrieved. The audio signal is partitioned into a plurality of small intervals, as illustrated in operation 829. In one embodiment, each segment partition is of a pre-set duration of time, such as 5 seconds. A particular segment within the plurality of segments is selected and analyzed to identify acoustic modulations within the particular segment, as illustrated in operation 830. The acoustic modulations are obtained by passing the audio segment through a bandpass filters and examining the modulation characteristics of the particular segment using FFT to identify energy distribution at each channel for each frequency of the audio segment. The examination of the modulation characteristics results in identifying a selective set of data points represented by floating point numbers. The set of floating point numbers is used to compute a distinct vector. The vector defines an unique audio fingerprint of the particular segment.

A content database is searched to identify one or more content with audio segments having data points that either match or in close proximity to the floating point numbers of the vector of the particular segment, as illustrated in operation 840. As mentioned earlier, the content database includes content from a plurality of content providers having audio segments that have been fingerprinted by the algorithm using the same technique. When more than one audio segment from one or more content provider include data points that match to the data points of the particular audio segment, the algorithm identifies content having an audio segment that is closest to the floating point numbers of the particular segment. The algorithm then obtains a content identifier of the content with the audio segment that closely matches the audio segment of the particular segment, as illustrated in operation 850. A content provider database is queried using information, such as content identifier, obtained from the content database, as illustrated in operation 860. In response to the query, an ID portion of the identified content is received from the content provider database, as illustrated in operation 870. The portion may include the identifier of content matching the particular segment and additional fingerprint for a pre-defined amount of time. In one embodiment, the additional recording may include recording for additional 15 seconds in addition to the 5 seconds related to the particular segment. The recording of audio content obtained from the content provider database is stored in a local cache and is used for further verification and for matching promotional media or event.

Figure 8:
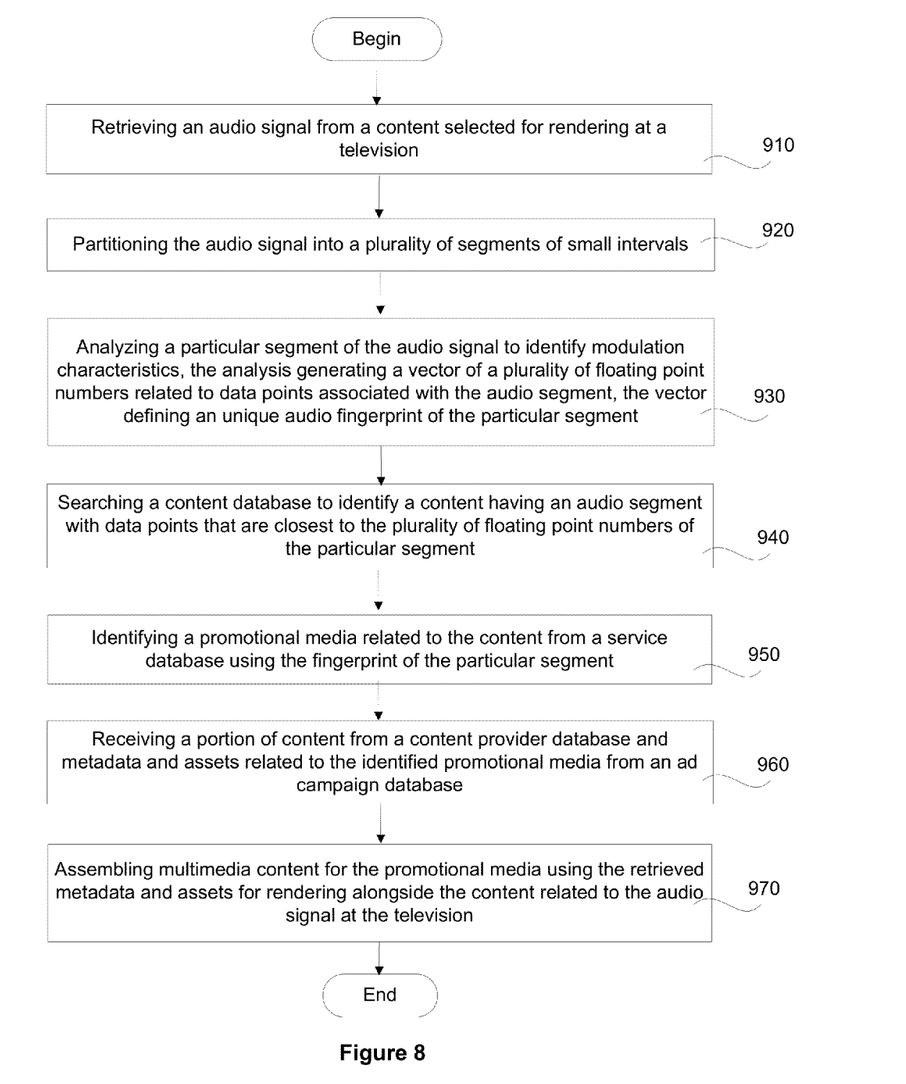
FIG. 8 illustrates an alternate embodiment identifying process flow operations for matching promotional media to content streaming through a television.

FIG. 8 illustrates yet another alternate embodiment for matching promotional media for content streaming through a television. The method begins at operation 910, wherein an audio signal is retrieved from the content that is selected for rendering at the television. The audio signal is partitioned into a plurality of segments of small intervals, as illustrated in operation 920. A particular segment of the audio signal is selected for analysis to identify modulation characteristics, as illustrated in operation 930. The particular audio segment may be selected based on the payload contained within. The analysis of the particular segment includes generating an acoustic spectrogram for the particular segment and identifying a plurality of floating point numbers related to data points in the acoustic spectrogram that defines the acoustic modulation of the particular segment of audio signal. A distinct vector is computed as a function of the floating point numbers. The vector defines a unique audio fingerprint of the audio segment.

In operation 940, a content database is searched to identify content that includes audio segment with data points that match or are in close proximity to the plurality of floating point numbers of the particular audio segment. The content database is a repository of pre-computed data points for a plurality of audio segments representing different portions of a plurality of audio signals for a plurality of content obtained from a plurality of content providers. Upon identifying content with audio signals matching the particular audio segment, the source of the content and the content information related to the content may be retrieved from the content provider using a content identifier.

Using the content identifier, a promotional media or event related to the content is identified from a service database using the fingerprint of the particular segment, as illustrated in operation 950. The content provider database is queried to obtain content from the content provider database and an ad campaign database is queried to obtain metadata and assets related to the identified promotional media, as illustrated in operation 960. The process concludes with the assembly of the multimedia content from the content obtained from the content provider database and assembly of promotional media content/application using the metadata and assets retrieved from the ad campaign database for rendering at the television, as illustrated in operation 970. The promotional media content may be presented in the form of a widget either alongside the content or separately, in one embodiment of the invention.

The algorithm acts like a potential bridge for creating broadcast interactivity service (BIS) for a user by determining what content a particular user is watching on his/her television by extracting features of the content through audio fingerprinting of a small segment of the audio signal related to the content and identifying a particular application or promotional multimedia related to the content for rendering alongside the content. The small segment of audio is matched against audio of a plurality of content received from content providers/broadcasters scheduled for the specific period of time, using modulation detection process wherein the two signals are matched based on their modulation similarities. This approach uses less CPU resources and time but provides more efficient and accurate match. In addition to the modulation match, the algorithm also provides for faster matches by enabling a recording of the matched content for the time segment and for an additional predefined amount of time to be stored locally in a local cache of the television and by continuing to verify that the identified content continues to match the audio signal of multimedia content selected for rendering at the television. When a user changes the multimedia content selected for viewing, the algorithm determines that the content stored in the local cache does not match and flushes the content. The algorithm then goes through the audio fingerprinting using HACs and LSH technology as described earlier, making this a more robust and efficient algorithmic tool.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations can include the physical transformations of data, saving of data, and display of data. These operations are those requiring physical manipulation of physical quantities. Usually, though not necessarily, these quantities take the form of electrical or magnetic signals capable of being stored, transferred, combined, compared and otherwise manipulated. Data can also be stored in the network during capture and transmission over a network. The storage can be, for example, at network nodes and memory associated with a server, and other computing devices, including portable devices.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for identifying multimedia content streaming to a television, the method executed by a processor, comprising:
    retrieving an audio signal for multimedia content selected for rendering at the television;
    partitioning the audio signal into a plurality of segments;
    analyzing a particular segment to identify acoustic modulations in the particular segment, the analysis generating a vector for the particular segment based on the acoustic modulation, the vector defining an unique audio fingerprint of the particular segment of the audio signal, wherein the vector identifies a plurality of floating point numbers of data points representing the unique audio fingerprint; and
    querying a content database on a server using the vector of the particular segment of audio signal to identify information data for the multimedia content, the content database including a plurality of pre-computed data points and each pre-computed data point is associated with information data for different multimedia content including the multimedia content rendered, wherein the information data is identified by finding a substantial match of the vector to data points in the content database, the querying causing the identified information data to be retrieved and stored in a local cache for local verification that the selected multimedia content remains selected, the retrieved and stored information data being valid for an upcoming additional amount of time.

2. The method of claim 1, wherein the audio signal is captured from multimedia content streamed to the television by a content provider or from a digital multimedia recording device.

3. The method of claim 1, wherein each segment is a predefined interval of about 5 seconds.

4. The method of claim 1, wherein analyzing further includes,
    generating an acoustic spectrogram to identify acoustic modulation characteristics for the particular segment of audio signal at one or more frequencies, wherein the acoustic modulation characteristics are spread over a plurality of channels;
    examining the acoustic modulation at each channel to measure magnitude, the magnitude identifying amount of energy in each channel at each frequency; and
    computing the vector of the particular segment of audio signal as a function of the measured magnitudes in each channel for each frequency for a time period associated with the particular segment of the audio signal.

5. The method of claim 4, wherein the examination of the acoustic modulation and measuring of magnitude is done using Fast Fourier Transformation technology.

6. The method of claim 1, further includes,
    when more than one information data has data points closest to the floating point numbers of the particular segment,
    performing additional matching by selecting one or more additional segments of the audio signal for the content currently selected for rendering at the television.

7. The method of claim 1, further includes,
    identifying an event or promotional media related to the multimedia content that is scheduled for rendering from a service database, the event or promotional media identified using information from the fingerprint of the particular segment;
    retrieving metadata and assets related to the identified event or promotional media from an ad campaign database; and
    assembling an application or multimedia content associated with the event or the promotional media using the retrieved metadata and assets, the assembled application or multimedia content related to event or promotional media rendered alongside the multimedia content related to the audio signal at the television.

8. The method of claim 1, further comprising,
    performing a verification that the data points of the information data continues to substantially match the data points of a current audio signal retrieved for rendering on the television.

9. The method of claim 1, wherein the retrieving and storing of the identified information data is repeated periodically, such that the retrieved and stored information data avoids looking to the server to verify that the multimedia content remains selected.

10. The method of claim 1, wherein when the vector does not match to data points in the content database, selecting a second segment of the audio signal and analyzing the second segment to generate a second vector, and matching the second vector to the data points in the content database on the server, the matching causing the information data related to the second vector to be retrieved and stored in the local cache for local verification.

11. A method for identifying content streaming to a television, the method executed by a processor, comprising:
    retrieving a set of audio fingerprints associated with a plurality of contents that are scheduled for rendering;
    storing the set of audio fingerprints in a local cache associated with the television;
    receiving a request for rendering a content on the television;

retrieving an audio signal for the content selected for rendering at the television;
analyzing a particular segment of the audio signal to identify acoustic modulations in the particular segment, the analysis generating a vector for the particular segment based on the acoustic modulation, the vector identifying a plurality of floating point numbers related to data points of the particular segment, the vector defining an unique audio fingerprint of the particular segment of the audio signal;
determining if a match is found for the audio fingerprint of the particular segment of the audio signal locally within the local cache by comparing the vector of the particular segment against the data points defined in the audio fingerprints of the plurality of contents stored in the local cache;
when a match is found in the local cache, querying a content provider database using a content identifier of a particular content matching the vector of the particular segment to obtain a portion of the particular content; and
rendering the particular content obtained from the content provider database in response to the request while continuing to periodically verify locally the content remains selected by matching the audio fingerprints of additional one or more segments of the audio signal to the audio fingerprints stored in the local cache.

12. The method of claim 11, further includes,
when the audio fingerprint of the particular segment of the audio signal does not match the audio fingerprints of any of the plurality of content stored in the local cache,
  forwarding a request to a content database for verification of a potential match of the audio fingerprint associated with the particular segment of the audio signal, wherein the request includes a content identifier for a content from a prior query;
  receiving confirmation from the content database of the potential match of the audio fingerprint of the particular segment of the audio signal.

13. The method of claim 11, further includes,
generating audio fingerprints for one or more additional segments of the audio signal for the content streaming to the television, periodically; and
verifying the audio signal streaming to the television continue to match to the particular content in the local cache by comparing the generated audio fingerprints for the one or more additional segments against the corresponding fingerprints of the content stored in the local cache.

14. The method of claim 11, wherein the set of audio fingerprints scheduled for rendering are retrieved periodically and stored in the local cache, and wherein the local cache is cleared prior to storing the retrieved audio fingerprints.

15. The method of claim 11, wherein results from the periodic verification are used in identifying and updating event or additional information related to the content for rendering.

16. The method of claim 15, wherein the updating event or additional information is rendered alongside the content.

17. A method, comprising:
receiving, at a television, an audio signal for multimedia content selected for rendering on the television;
using a processor, partitioning the audio signal into a plurality of segments;
using a processor, analyzing a particular segment to identify acoustic modulations, the analysis generating a vector based on the acoustic modulation, the vector defining an unique audio fingerprint having a plurality of floating point numbers of data points;
querying a content database on a server using the vector of the particular segment of audio signal to identify a description for multimedia content, the content database including pre-computed data points for a plurality of multimedia content, the identification of the description including matching of the vector to the pre-computed data points in the content database, the querying causing the identified description for the multimedia content to be retrieved and stored in a local cache for local verification that the selected multimedia content remains selected, the retrieved and stored description includes pre-computed data points of the particular segment and pre-computed data points of upcoming one or more segments of the multimedia content rendering on the television.

18. The method of claim 17, wherein the description of the multimedia content is used to obtain content that relates to the multimedia content.

19. The method of claim 17, wherein the content that relates to the multimedia content is rendered along with the multimedia content on the television.

* * * * *